Aug. 28, 1956     F. CELORIO MENDOZA     2,760,447
MACHINE FOR TREATING DOUGH

Filed April 8, 1955     2 Sheets—Sheet 1

INVENTOR
FAUSTO CELORIO MENDOZA

BY Ogle R. Singleton

ATTORNEY

INVENTOR
FAUSTO CELORIO MENDOZA
BY *Ogle R. Singleton*
ATTORNEY

United States Patent Office 2,760,447
Patented Aug. 28, 1956

2,760,447

MACHINE FOR TREATING DOUGH

Fausto Celorio Mendoza, Mexico City, Mexico

Application April 8, 1955, Serial No. 500,204

3 Claims. (Cl. 107—14)

My invention consists in a new and useful improvement in machines for treating dough and is an improvement of my invention which is described and claimed in my co-pending application Serial Number 381,451, filed on September 21, 1953. The valuable feature of my invention described and claimed in this my present application is the novel means which I provide for controlling the degree of pressure exerted upon the dough as it is extruded from the mixing hopper, to prevent undesirable conditions as to the consistency and form of the dough. This means comprises a conduit, having a feed worm and a control gate, which connects the discharge end of the tube from the hopper with the hopper, so that a portion of the feed from the hopper can be returned to the hopper under carefully controlled conditions whereby the discharge of the dough from the mixing hopper can be precisely controlled.

While I have disclosed in the drawings and hereinafter fully describe one specific embodiment of my invention, it is to be distinctly understood that I do not consider my invention to be limited to said embodiment but refer for its scope to the claims appended hereto.

Figure 1:
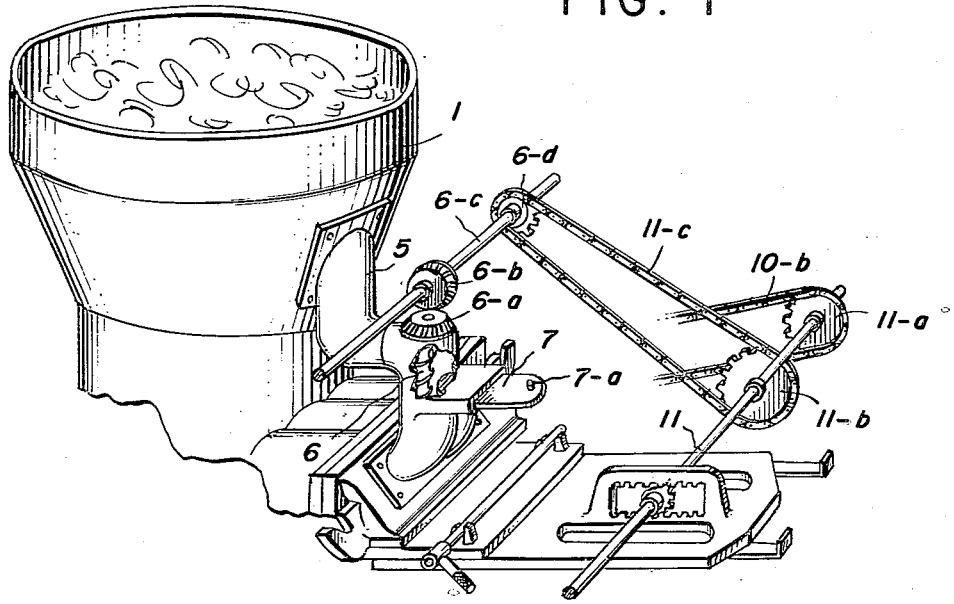
Fig. 1 is a perspective of my improved device.
Figure 3:
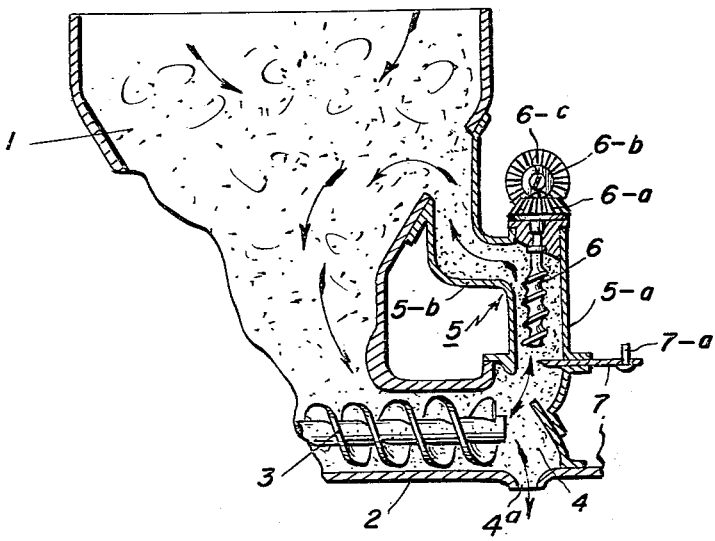
Fig. 3 is a vertical, fragmentary section of the device.
Figure 4:
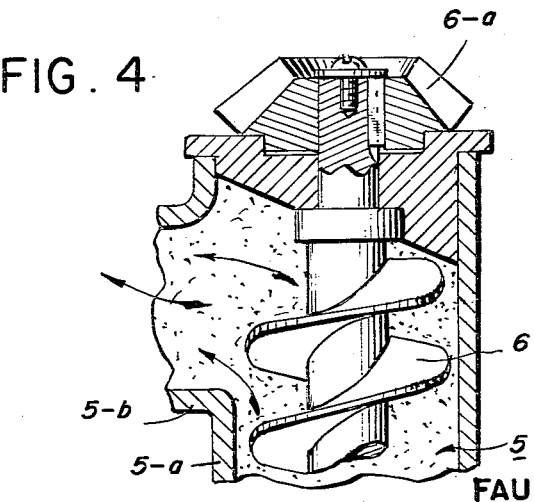
Fig. 4 is a fragmentary, enlarged vertical section of a portion of the device.

As shown in the drawings, my improved device has a hopper 1 (Figs. 1 and 3) in which the dough is treated as shown in my said co-pending application Serial Number 381,451. The hopper 1 has in its bottom at least one discharge tube 2 in which is disposed a feed worm 3. The tube 2 debouches into a chamber 4 having in its bottom a discharge slot 4–a through which the dough passes for treatment as disclosed in my said co-pending application Serial Number 381,451. The chamber 4 has at its top a conduit 5 connecting the chamber 4 with the hopper 1 (Figs. 1 and 3). This conduit 5 has a vertical portion 5–a rising from the chamber 4 and a horizontal portion 5–b extending from the upper end of the portion 5–a into the hopper 1. Suitably journaled in the portion 5–a there is a feed worm 6. At the lower end of the portion 5–a of the conduit 5 there is a closure slide 7.

The worm 6 has on its upper end bevel gears 6–a, 6–b driven by shaft 6–c suitably journaled on the device.

Figure 2:
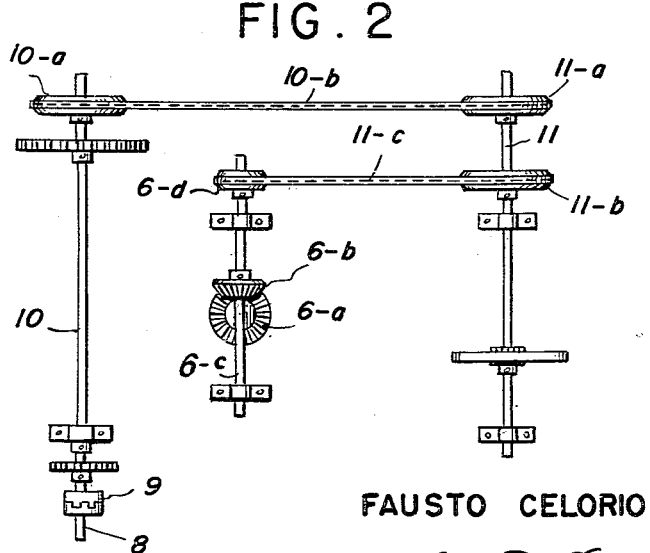
Fig. 2 is a top plan of the driving means for the device.

The driving system for my improved device is shown in Fig. 2. A drive shaft 8 can be connected and disconnected by a clutch 9 with and from a shaft 10 for actuating the mechanism of my device disclosed in my said co-pending application Serial Number 381,451. A sprocket wheel 10–a on the shaft 10 is connected by a sprocket chain 10–b with a shaft 11 by a sprocket wheel 11–a on the shaft 11. A sprocket wheel 11–b on shaft 11 is connected by a sprocket chain 11–c with shaft 6–c by a sprocket wheel 6–d thereon.

Figure 5:
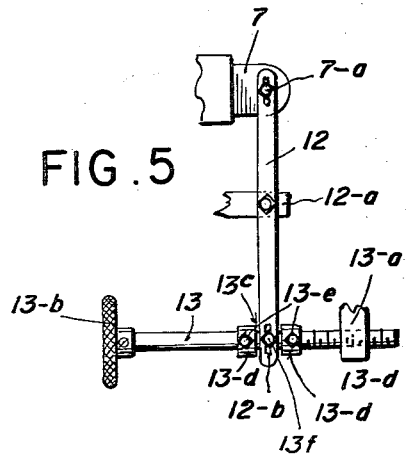
Fig. 5 is a fragmentary, top plan of a portion of the device.

The mechanism for controlling the slide 7 is shown in Fig. 5. The slide 7 has pivoted on its outer end 7–a projecting outwardly of the conduit 5 an operating lever 12 suitably pivoted on a bracket 12–a on the device. A control shaft 13 is threaded in a bracket 13–a on the device and provided with an operating knob 13–b. A sleeve 13–c is loosely mounted on the shaft 13 and held against axial displacement by collars 13–d held on the shaft 13 by screw bolts 13–e. A pin 13–f on the sleeve 13–c is received in a slot 12–b in the outer end of the lever 12.

Having described the details of construction of my improved machine, I will now describe its use and operation.

By manipulating the control shaft 13, the slide 7 may be adjusted to the precise position to admit the desired fraction of the dough from the chamber 4 into the conduit 5. When the machine is operating the worm 6 conveys the dough admitted to the conduit 5, through the conduit 5 into the hopper 1, thereby accurately controlling the pressure exerted by the worm 3 feeding the dough through the slot 4–a.

Having described my invention, what I claim is:

1. In a machine for treating dough, the combination of a hopper having a discharge port at its bottom; a conduit leading from said port and having a discharge slot at its outer end; a conveyor worm in said conduit adapted to convey the dough from said hopper through said conduit and extrude the dough under pressure through said slot; a second conduit communicating at one end with said first conduit, at a point intermediate the outer end of said worm and said slot, said second conduit having an outlet port at its other end communicating with said hopper; a second conveyor worm in said second conduit, adapted to convey a portion of the dough from said first conduit to said hopper; and a slide valve in said second conduit adapted to regulate the amount of said portion.

2. A machine, according to claim 1, having a drive shaft, a driven shaft, a clutch adapted to connect said shafts, means driven by said driven shaft and adapted to drive said first conveyor worm, and means driven by said driven shaft and adapted to drive said second conveyor worm.

3. A machine, according to claim 1, having a lever pivoted on the machine intermediate its ends; a pin on said slide valve on which one end of said lever is pivoted, and a manually rotatable shaft threadedly mounted in a support on said machine, and said shaft, intermediate its ends being so connected to the other end of said lever as to be adapted, when rotated, to rock said lever to adjust said slide valve.

References Cited in the file of this patent

UNITED STATES PATENTS

| | | |
|---|---|---|
| 533,655 | Lomax | Feb. 5, 1895 |
| 547,263 | Hoyle | Oct. 1, 1895 |

OTHER REFERENCES

Gaceta de la Propiedad Industrial—Mexico, March 1952, p. 425—Mexican Patent No. 51,923 to Celorio. (Copy in Scientific Library U. S. Patent Office.)